United States Patent [19]
Poublon et al.

[11] Patent Number: 5,847,271
[45] Date of Patent: Dec. 8, 1998

[54] CATALYTIC CONVERTER EFFICIENCY MONITOR

[75] Inventors: Mark J. Poublon, Utica; Michael W. Weglarz, Macomb Township, both of Mich.

[73] Assignee: Chrysler Corporation, Auburn Hills, Mich.

[21] Appl. No.: 646,660

[22] Filed: May 8, 1996

[51] Int. Cl.$^6$ .................................................. G01M 15/00
[52] U.S. Cl. .................. 73/118.1; 73/23.31; 60/277; 340/438; 364/431.062
[58] Field of Search ................. 73/23.31, 23.32, 73/116, 117.2, 117.3, 118.1; 60/277; 340/438; 364/431.051, 431.062

[56] References Cited

U.S. PATENT DOCUMENTS

| | | | |
|---|---|---|---|
| 3,969,932 | 7/1976 | Rieger et al. | 73/118.1 |
| 5,157,921 | 10/1992 | Ito et al. | 73/118.1 |
| 5,165,230 | 11/1992 | Kayanuma et al. | 73/118.1 |
| 5,175,997 | 1/1993 | Blanke, Sr. | 73/118.1 |
| 5,335,538 | 8/1994 | Blischke et al. | 73/118.1 |
| 5,363,091 | 11/1994 | Kotwicki et al. | 73/118.2 |
| 5,388,454 | 2/1995 | Kuroda et al. | 73/118.1 |
| 5,396,794 | 3/1995 | Nichols | 73/118.1 |
| 5,404,861 | 4/1995 | Wild | 73/118.1 |
| 5,431,043 | 7/1995 | Gugel et al. | 73/117.3 |
| 5,444,974 | 8/1995 | Beck et al. | 73/118.1 |

OTHER PUBLICATIONS

SAE Technical Paper Series, Detection of Catalyst Performance Loss Using On–Board Diagnostics, William B. Clemmens, Michael A. Sabourin and Thomas Rao, Mar. 7, 1990. (#900062).

*Primary Examiner*—George M. Dombroske
*Attorney, Agent, or Firm*—Mark P. Calcaterra

[57] ABSTRACT

A method of monitoring efficiency of a catalytic converter in a motor vehicle includes the steps of determining if at least one predetermined condition is met for monitoring the efficiency of the catalytic converter and combining a square wave multiplier signal with a feedback multiplier signal if the at least one predetermined condition is met. The method includes counting a number of square wave edges of the combined signal for an upstream oxygen sensor positioned upstream of the catalytic converter and counting a number of switches of a signal across a predetermined switch point from a downstream oxygen sensor positioned downstream of the catalytic converter. The method also includes the steps of calculating a switching frequency ratio based on the count of square wave edges and oxygen sensor switches and using the switching frequency ratio to establish the efficiency level of the catalytic converter.

11 Claims, 3 Drawing Sheets

CATALYTIC CONVERTER EFFICIENCY MONITOR

BACKGROUND OF THE INVENTION

1. Field of the Invention

The present invention relates generally to catalytic converters and, more particularly, to a method for monitoring efficiency of a catalytic converter in a motor vehicle.

2. Description of the Related Art

Increasingly stringent federal and state motor vehicle emission standards include On-Board Diagnostic regulations requiring that specific emission related systems on a motor vehicle be monitored. The intent of the regulations is to ensure that these systems are functioning as intended, and if the systems have deteriorated, that the vehicle operator be informed. For example, a catalytic converter of a motor vehicle is monitored because of its ability to reduce undesirable emissions in exhaust gases from the engine of the motor vehicle.

The catalytic converter may deteriorate over time due to factors such as engine misfire, a faulty oxygen sensor, poisoning or prolonged high temperature operation. As the catalytic converter deteriorates, it loses its capacity to store the oxygen available in the exhaust gases. This results in an oxygen sensor located downstream of the catalytic converter responding with faster, more frequent switching between a rich and lean condition.

An example of a catalyst monitoring system is disclosed in a Society of Automotive Engineers paper, Number 900062, by Clemmens, Sabourin and Rao. This catalyst monitoring system uses a ratio of voltage threshold crossings of oxygen sensors upstream and downstream of the catalytic converter while the engine is operating in an open loop condition. As the catalytic converter deteriorates, and the downstream oxygen sensor begins to switch more frequently, the ratio of voltage threshold crossings approaches one.

One disadvantage of the above catalyst monitoring system is that it imposes an open loop square wave forcing function on the fuel/air ratio, making it difficult to maintain the fuel/air ratio near stoichiometric under actual driving conditions. Another disadvantage of the catalyst monitoring system is that the resolution is poor if applied to a closed loop condition, and the catalyst monitoring system may indicate that a catalytic converter is deteriorated, when in fact it is good. Consequently, there is a need in the art for monitoring a catalytic converter that does not have a significant effect on maintaining the fuel/air ratio at desired levels. There is also a need in the art for monitoring a catalytic converter that accurately measures the deterioration of the catalytic converter.

SUMMARY OF THE INVENTION

It is, therefore, one object of the present invention to provide a method for monitoring the efficiency of a catalytic converter in a motor vehicle.

It is another object of the present invention to provide a method for monitoring the efficiency of a catalytic converter that accurately identifies if a catalytic converter has deteriorated below a predetermined level.

It is yet another object of the present invention to provide a method for monitoring the efficiency of a catalytic converter while the engine is operating under closed loop conditions.

To achieve the foregoing objects, the present invention is a method for monitoring efficiency of a catalytic converter in a motor vehicle including the steps of determining if at least one preestablished condition is met for monitoring the efficiency of the catalytic converter and combining a square wave multiplier signal with a feedback multiplier signal if the at least one preestablished condition is met. The method includes the steps of counting a number of square wave edges of the combined signal for an upstream oxygen sensor positioned upstream of the catalytic converter and counting a number of switches of a signal across a predetermined switch point from a downstream oxygen sensor positioned downstream of the catalytic converter. The method also includes the steps of calculating a switching frequency ratio based on the count of square wave edges and oxygen sensor switches and using the switching frequency ratio to establish the efficiency level of the catalytic converter.

One advantage of the present invention is that a method is provided for monitoring the efficiency of a catalytic converter in a motor vehicle. Another advantage of the present invention is that the method for monitoring the efficiency of the catalytic converter has improved accuracy to avoid false positive or false negative results. Yet another advantage of the present invention is that the method for monitoring the efficiency of the catalytic converter takes place while the engine is operating at closed loop condition. A further advantage of the present invention is that the method for monitoring the efficiency of the catalytic converter has a square wave period based on engine speed or airflow.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
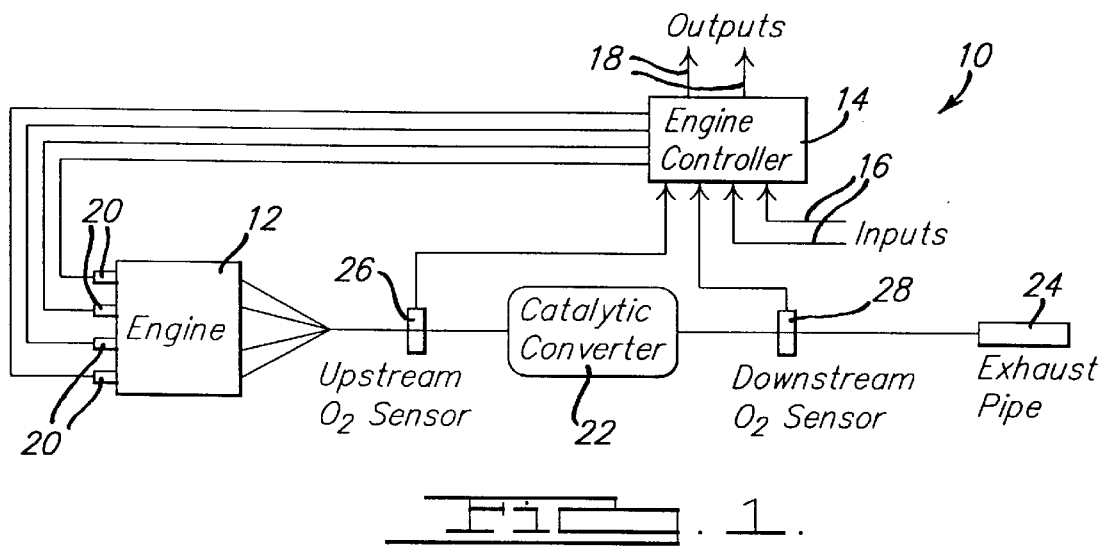
FIG. 1 is a schematic diagram of an emission control system used in conjunction with a method, according to the present invention, for monitoring efficiency of a catalytic converter of the emission control system.

Referring to FIG. 1, an emission control system 10 for a motor vehicle (not shown) is illustrated. The emission control system 10 includes an engine 12 and an engine controller 14 in communication with the engine 12. The engine controller 14 includes a microprocessing unit, memory, inputs 16, outputs 18, communication lines and other hardware and software necessary to control the engine 12 and related tasks (not shown but known in the art). It should be appreciated that the engine controller 14 may control tasks such as maintaining fuel to air ratio, spark timing, exhaust gas recirculation and on-board diagnostics. It should also be appreciated that the emission control system 10 may also include other sensors, transducers or the like that are in communication with the engine controller 14 through the inputs 16 and outputs 18 to further carry out a method, according to the present invention, to be described.

The emission control system 10 also includes at least one, preferably a plurality of fuel injectors 20 which receive a signal from the engine controller 14 to precisely meter an amount of fuel to the engine 12. As a result of the combustion process that takes place in the engine 12, exhaust gasses are created and passed out of the engine 12. Constituents of the exhaust gas include hydrocarbons, carbon monoxide and oxides of nitrogen, which are all known to have a potential detrimental effect on air quality.

The emission control system 10 includes a catalytic converter 22 for receiving the exhaust gas from the engine 12. The catalytic converter 22 contains material which serves as a catalyst to reduce or oxidize the components of the exhaust gas into harmless gasses. The emission control system 10 includes an exhaust pipe 24 connected to the catalytic converter 22 into the atmosphere.

The emission control system 10 further includes an upstream oxygen sensor 26 and downstream oxygen sensor 28 which measure the level of oxygen in the exhaust gas. The upstream oxygen sensor 26 is positioned in front or upstream of the catalytic converter 22. Similarly, the downstream oxygen sensor 28 is positioned after or downstream of the catalytic converter 22. It should be appreciated that as part of the emission control system 10, the oxygen sensors 26, 28 are in communication with the engine controller 14.

Referring to FIGS. 2A through 2D, signals representative of typical feedback loop control are illustrated. For example, in FIG. 2A, a feedback multiplier signal 50 is sent by the engine controller 14 to the fuel injector 20. The multiplier signal 50 has a pulsewidth value 52 that controls the amount of fuel delivered by the fuel injector 20 by the duration of the pulsewidth. For example, if the upstream oxygen sensor 26 is indicating a lean condition, the multiplier signal 50 is increased with a kick and a ramp to increase the amount of fuel released by the fuel injector 20. Likewise, if the upstream oxygen sensor 26 is indicating a rich condition, the multiplier signal 50 is reduced, to decrease the amount of fuel.

Figure 2A:
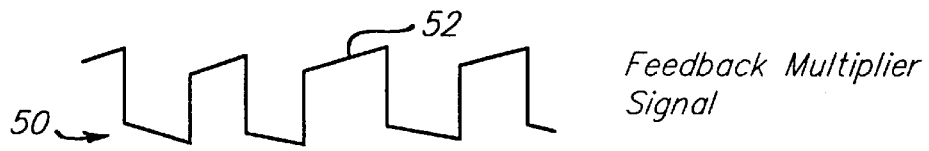
FIGS. 2A, 2B, 2C, and 2D are diagrams of signals representative of typical feedback loop control for the emission control system of FIG. 1.
Figure 2B:
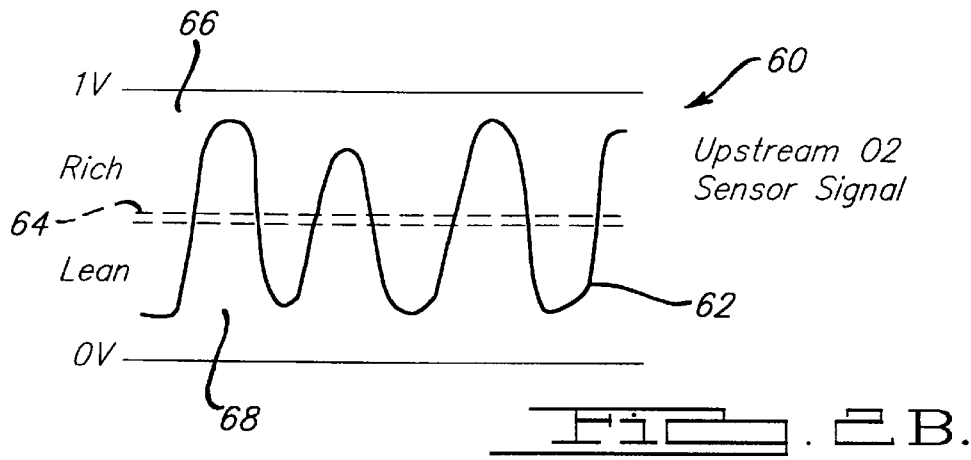

Referring to FIG. 2B, an example of an upstream oxygen sensor signal 60 from the upstream oxygen sensor 26 is shown. The oxygen sensor signal 60 is representative of a wave form, and varies between two predetermined voltages, such as zero (0) and one (1) volt in this example. A predetermined voltage threshold or switch point 64 denotes stoichiometric. It should be appreciated that the switch point 64 can represent a single voltage or a narrow band. A rich condition 66 is indicated when the oxygen sensor signal 60 is above the switch point 64 and a lean condition 68 when the oxygen sensor signal 60 is below the switch point 64.

Figure 2C:
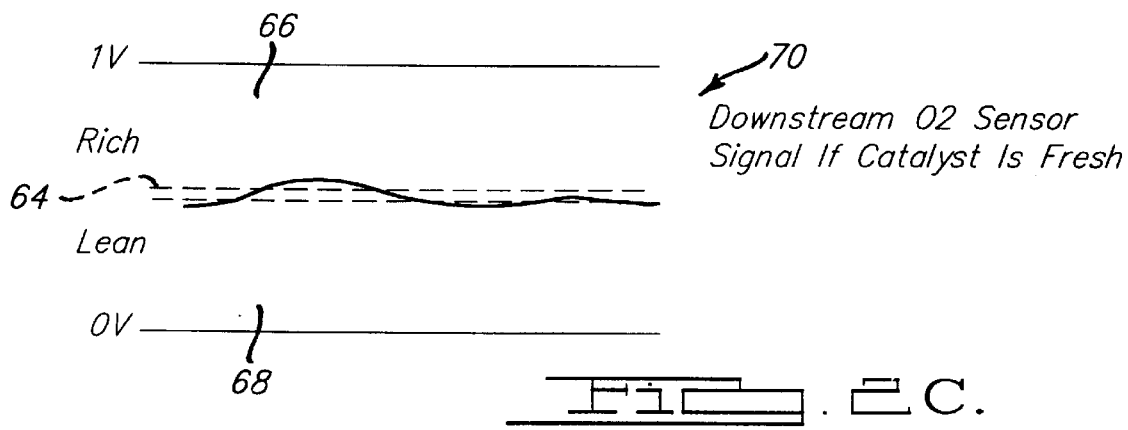
Figure 2D:
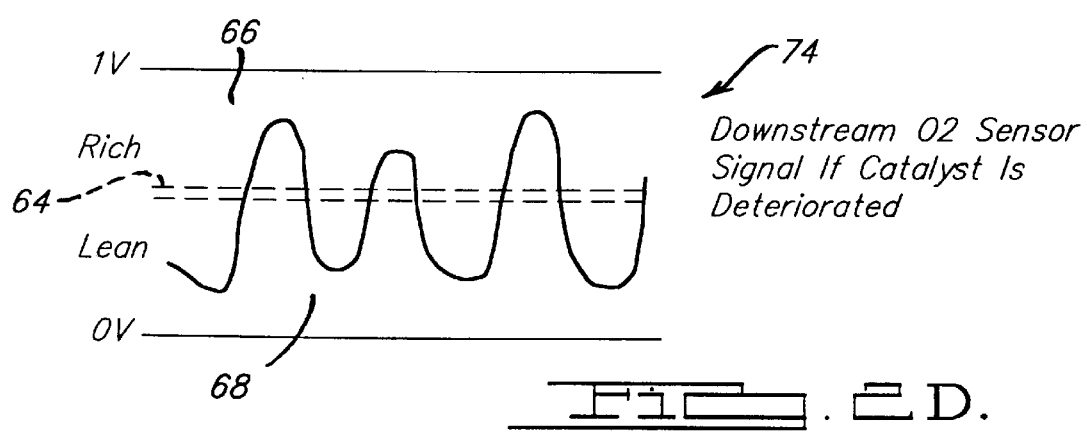

Referring to FIGS. 2C and 2D, a downstream oxygen sensor signal 70 from the downstream oxygen sensor 28 is shown. Similar to the upstream oxygen sensor signal 60, the oxygen sensor signal 70 represents a wave form varying between zero (0) and one (1) volt in this example. In FIG. 2C, the oxygen sensor signal 70 is characteristic of a newer catalytic converter 22. The signal 70 of FIG. 2C can be directly compared to a downstream oxygen sensor signal 74 in FIG. 2D. In FIG. 2D, the downstream oxygen sensor signal 74 is illustrated when the catalytic converter 22 is deteriorated. The oxygen sensor signal 74 has greater amplitude than the oxygen sensor signal 70 of FIG. 2C.

Figure 3A:
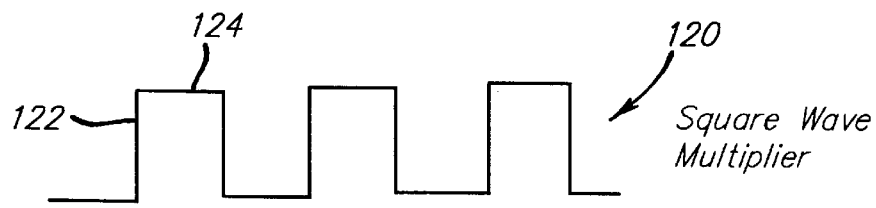
FIGS. 3A, 3B, 3C are diagrams of signals representative of combining a square wave multiplier signal with a feedback multiplier signal for the emission control system of FIG. 1.
Figure 3B:
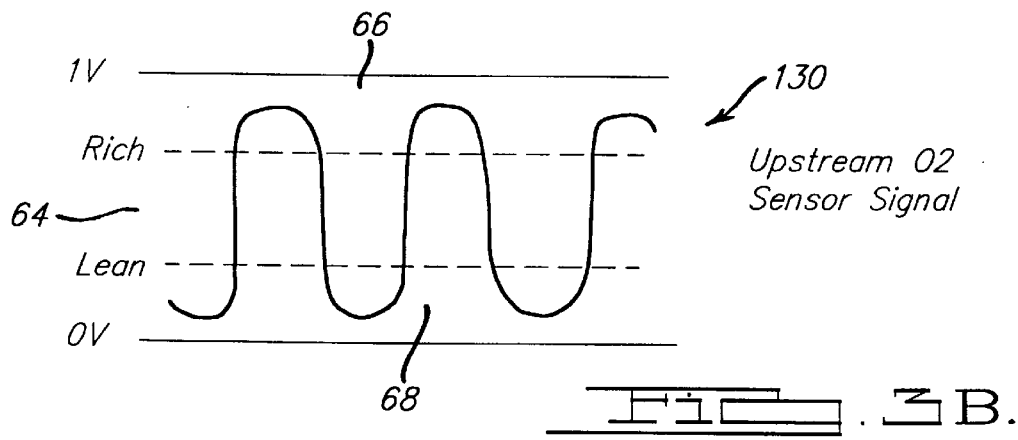
Figure 3C:
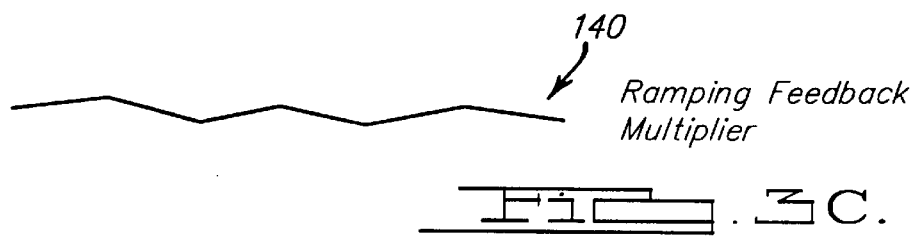

Referring to FIGS. 3A, 3B, and 3C, the effect of combining a square wave multiplier with a slow, unaggressive feedback multiplier signal is illustrated. Referring to FIG. 3A, a typical square wave multiplier 120 is illustrated. It should be appreciated that the square wave multiplier 120 is a signal having a calibratable magnitude 122 and period 124.

It should further be appreciated that the period 124 may be engine speed or airflow based, instead of time based.

Referring to FIG. 3B, a typical upstream oxygen sensor signal 130 from the upstream oxygen sensor 26 is illustrated. In FIG. 3C, a ramping feedback multiplier 140 is illustrated. The feedback multiplier 140 is characteristically slow and unagressive, which in combination with the oxygen sensor signal 130 from the upstream oxygen sensor 26, maintains the fuel/air ratio centered around stoichiometric. By varying the magnitude and period of the square wave multiplier 120, it is possible to test for various levels of oxygen storage capacity in the catalytic converter 22. Since oxygen storage capacity is directly related to the efficiency of the catalytic converter 22, it is possible to determine whether the catalytic converter 22 has deteriorated beyond a desired efficiency level.

Figure 4:
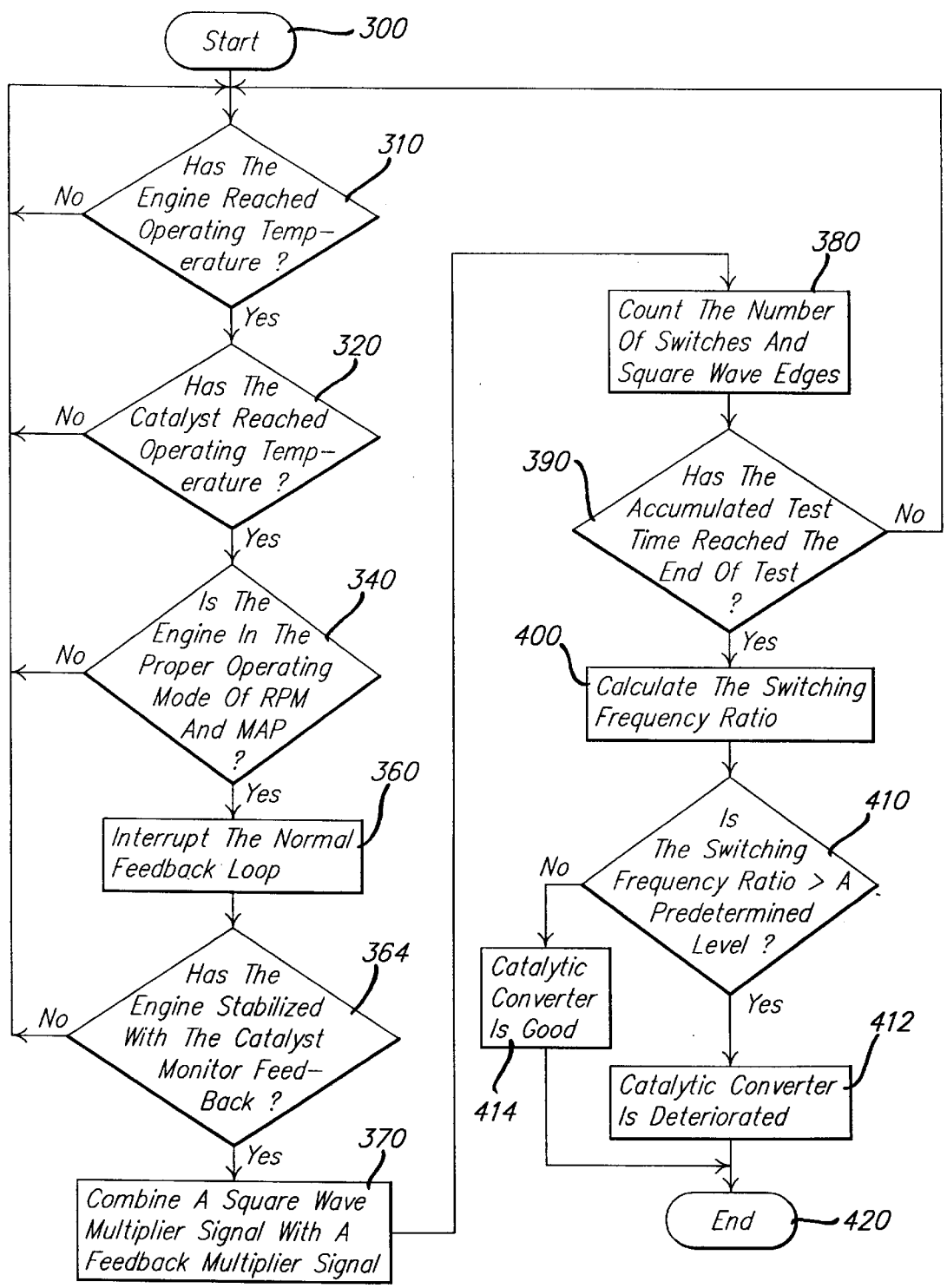
FIG. 4 is a flowchart of a method for monitoring the efficiency of a catalytic converter, according to the present invention, for the emission control system of FIG. 1.

Referring to FIG. 4, a method for monitoring the efficiency of the catalytic converter 22, according to the present invention, is illustrated. The methodology starts or begins in block 300, after being called for by the engine controller 14. The methodology advances to diamond 310 and determines if at least one preestablished condition is met for continuing the method. An example of a preestablished condition is if the engine 12 has reached a predetermined operating temperature such as 180° F. If the preestablished condition is not met, the methodology returns to diamond 310. If the preestablished condition is met, the methodology advances to diamond 320.

In diamond 320, the methodology determines whether another preestablished condition is met for continuing the method. An example of another preestablished condition is that the catalytic converter 22 is warmed up or reached a predetermined operating temperature such as 800° F. if the vehicle has been operated at vehicle speed greater than a predetermined speed such as twenty miles per hour (20 mph) for a predetermined time such as three (3) minutes. If the preestablished condition is not met, the methodology returns to diamond 310 previously described. If the preestablished condition is met, the methodology advances to diamond 340. In diamond 340, the methodology determines whether a further preestablished condition is met. An example of yet another preestablished condition is if the engine 12 is in a proper operating mode of engine speed (RPM) such as 1000<RPM<2000 and manifold absolute pressure (MAP) such as 300<MAP<500 torr. If the preestablished condition is not met, the methodology returns to diamond 310 previously described. If the preestablished condition is met, the methodology advances to block 360.

In block 360, the methodology interrupts the current fuel/air ratio feedback loop and the methodology advances to diamond 364. In diamond 364, the methodology determines if the engine 12 has stabilized with the feedback multiplier signal 50 by waiting a calibratable time such as one to two seconds. If the engine 12 has not stabilized, the methodology returns to diamond 310 previously described. If the engine 12 has stabilized, the methodology advances to block 370.

In block 370, the methodology combines the signal of the square wave multiplier 120 with the signal of the ramping feedback multiplier 140 and continues to block 380. In block 380, the methodology counts the number of times or square wave edges of the combined signal for the upstream oxygen sensor 26 and the number of times or switches of the signal from the downstream oxygen sensor 28 across the switch points 64, i.e. switches between a rich or lean condition. The methodology advances to diamond 390 and determines if the accumulated test time has reached a predetermined end of test condition such as twenty (20) seconds. If the accumulated test time has not reached the end of test condition, the methodology returns to diamond 310 previously described.

If the accumulated test time has reached the end of test condition the methodology advances to block 400. In block 400, the methodology calculates the switching frequency ratio by taking the count of oxygen sensor switches from the downstream oxygen sensor 28 and dividing it by the count of square wave edges for the upstream oxygen sensor 26.

After block 400, the methodology advances to diamond 410 and evaluates the switching frequency ratio to determine the efficiency of the catalytic converter 22. An empirical relationship may be derived between the switching frequency ratio and catalytic converter 22 efficiency. A predetermined level or value can then be selected as an indicator distinguishing between a good and a deteriorated catalytic converter 22. Therefore, the methodology determines whether the switching frequency ratio is greater than a predetermined value such as 0.8. If the switching frequency ratio is greater than the predetermined value, the methodology advances to block 412 and concludes that the catalytic converter 22 is deteriorated. The methodology may notify an operator of the vehicle through a malfunction indicator light on an instrument cluster (not shown but well known in the art) of the vehicle. The methodology then advances to bubble 420 and ends, where control is returned to the engine controller 14. If the switching frequency ratio is less than the predetermined level, the methodology advances to block 414 and concludes that the catalytic converter 22 is not deteriorated or good. The methodology then advances to bubble 420, previously described.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for monitoring efficiency of a catalytic converter in a motor vehicle, said method comprising the steps of:
    operating an engine under a closed loop condition;
    determining if at least one preestablished condition is met for monitoring the efficiency of the catalytic converter;
    determining whether the engine has stabilized if the at least one preestablished condition is met:
    combining a square wave multiplier signal with a feedback multiplier signal if the engine has stabilized;
    counting a number of square wave edges of the combined signal for an upstream oxygen sensor positioned upstream of the catalytic converter;
    counting a number of switches of a signal across a predetermined switch point from a downstream oxygen sensor positioned downstream of the catalytic converter;
    calculating a switching frequency ratio based on the count of square wave edges and oxygen sensor switches; and
    using the switching frequency ratio to establish the efficiency level of the catalytic converter.

2. A method as set forth in claim 1 wherein said step of calculating comprises calculating a switching frequency ratio by dividing the count of switches from downstream oxygen sensor by the count of square wave edges for the upstream oxygen sensor.

3. A method as set forth in claim 1 including the step of comparing the switching frequency ratio to a predetermined level after said step of calculating.

4. A method as set forth in claim 1 wherein said step of determining if at least one preestablished condition is met comprises determining if the catalytic converter is warmed up and ending said method if the catalytic converter is not warmed up.

5. A method as set forth in claim 1 wherein said step of determining if at least one preestablished condition is met comprises determining if the engine is warmed up and ending said method if the engine is not warmed up.

6. A method as set forth in claim 1 wherein said step of comparing the switching frequency ratio comprises determining if the switching frequency ratio is greater than a predetermined level and indicating that the catalytic converter is efficient if the switching frequency ratio is less than the predetermined level, and indicating that the catalytic converter is not efficient if the switching frequency ratio is greater than the predetermined level.

7. A method as set forth in claim 6 wherein said step of indicating that the catalytic converter is not efficient comprises setting an indicator alerting an operator of the motor vehicle that the catalytic converter has deteriorated.

8. A method for monitoring efficiency of a catalytic converter in a motor vehicle having an internal combustion engine, said method comprising the steps:
    operating an engine under a closed loop condition;
    determining if at least one predetermined condition is met for monitoring the efficiency of the catalytic converter;
    determining whether the engine has stabilized if the at least one preestablished condition is met;
    combining a square wave multiplier signal with a feedback multiplier signal if the engine has stabilized;
    counting a number of square wave edges of the combined signal for an upstream oxygen sensor positioned upstream of the catalytic converter;
    counting a number of switches of a signal across a predetermined switch point from a downstream oxygen sensor positioned downstream of the catalytic converter;
    calculating a switching frequency ratio based on the count of the square wave edges and oxygen sensor switches;
    determining if the switching frequency ratio is greater than a predetermined level;
    concluding that the catalytic converter is efficient if the switching frequency ratio is less than the predetermined level; and
    concluding that the catalytic converter is not efficient if the switching frequency ratio is greater than the predetermined level.

9. A method as set forth in claim 8 wherein said step of determining if at least one predetermined condition is met comprises determining if the catalytic converter is warmed up and ending said method if the catalytic converter is not warmed up.

10. A method as set forth in claim 8 wherein said step of determining if at least one predetermined condition is met comprises determining if the engine is warmed up and ending said method if the engine is not warmed up.

11. A method as set forth in claim 8 wherein said step of concluding that the catalytic converter is not efficient comprises setting an indicator alerting an operator of the motor vehicle that the catalytic converter has deteriorated.

\* \* \* \* \*